INVENTOR.
HENRY K. FLINCHBAUGH
BY Paul + Paul
ATTORNEYS.

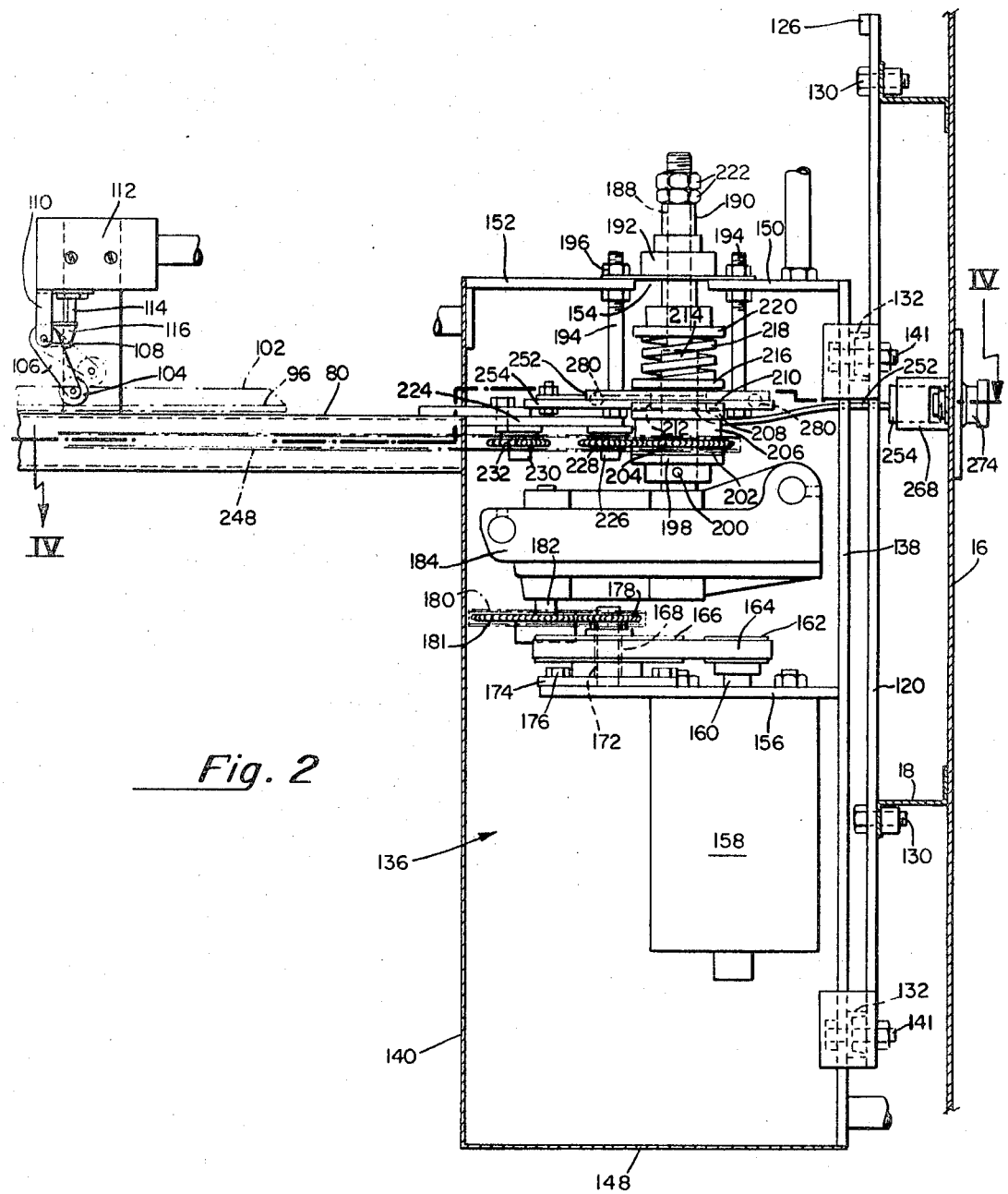

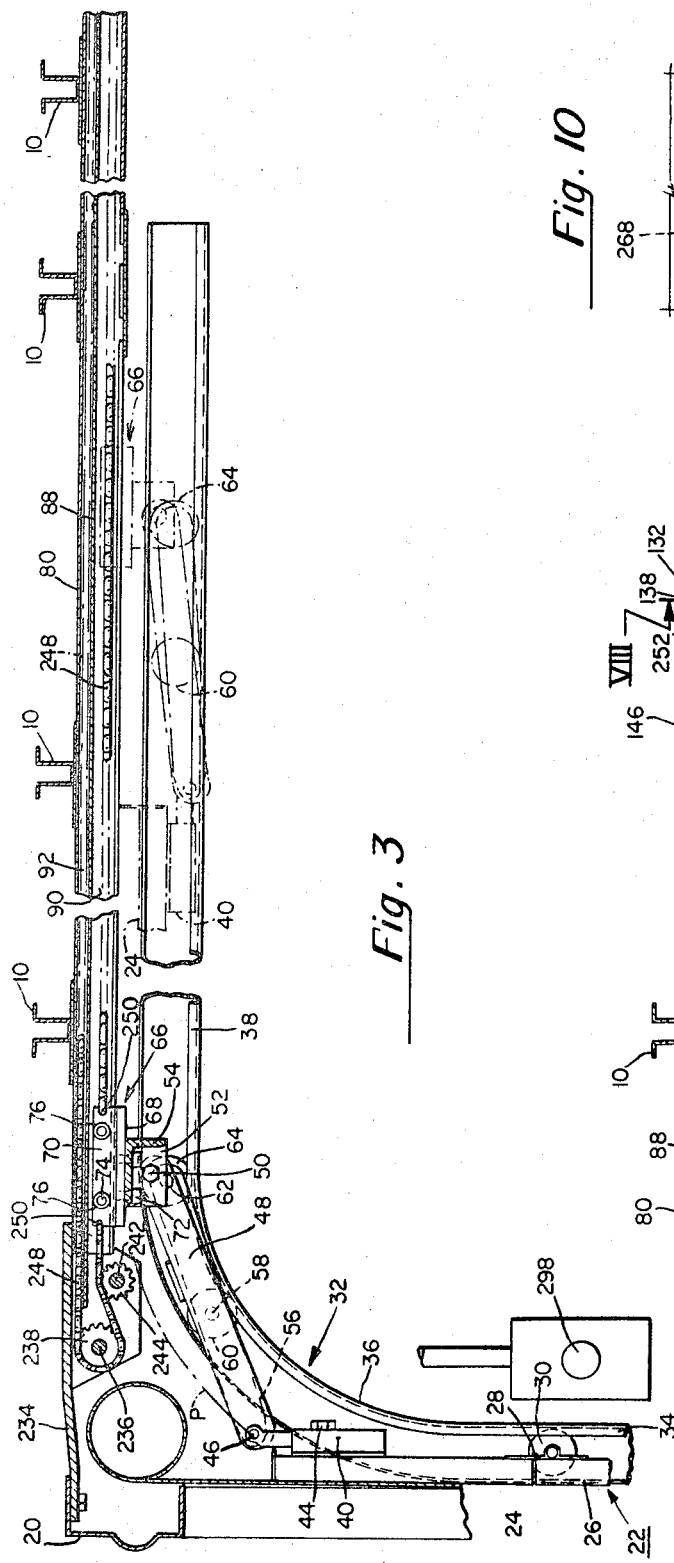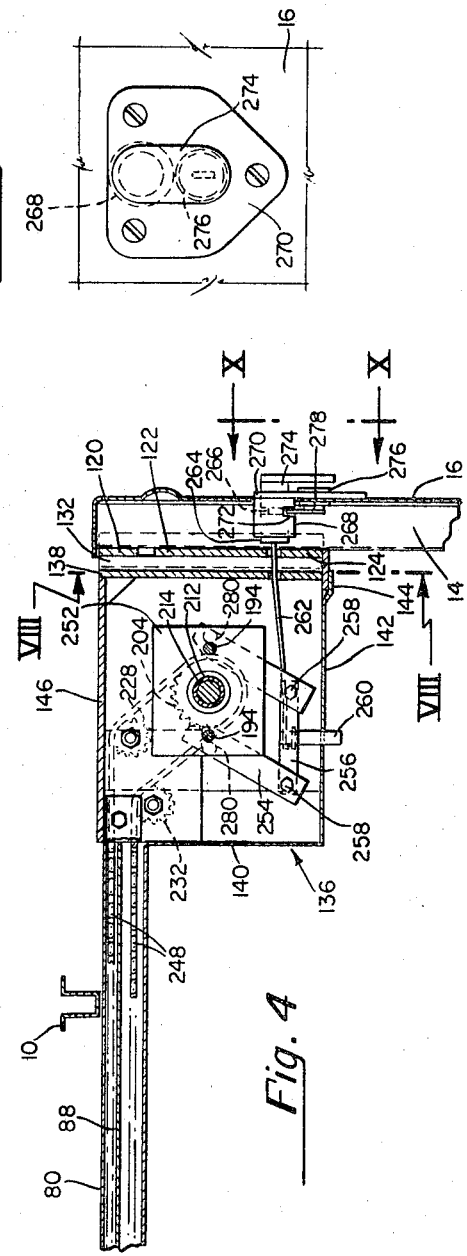

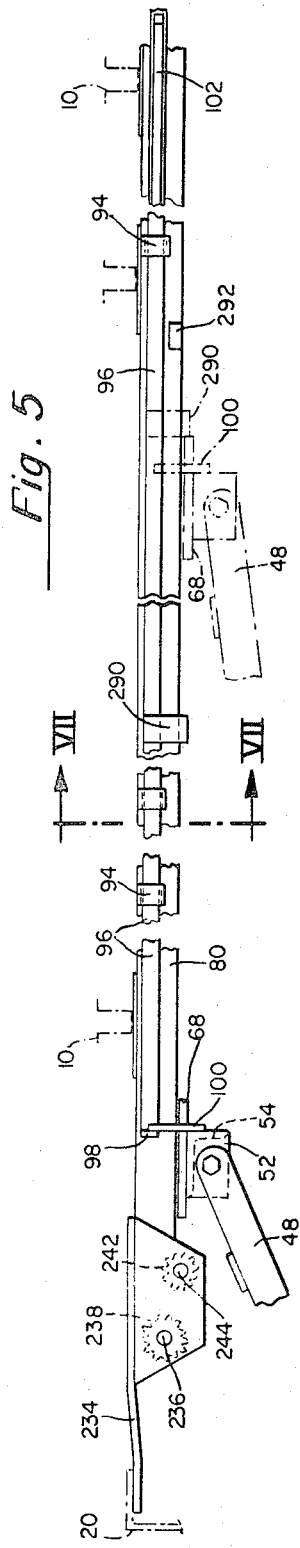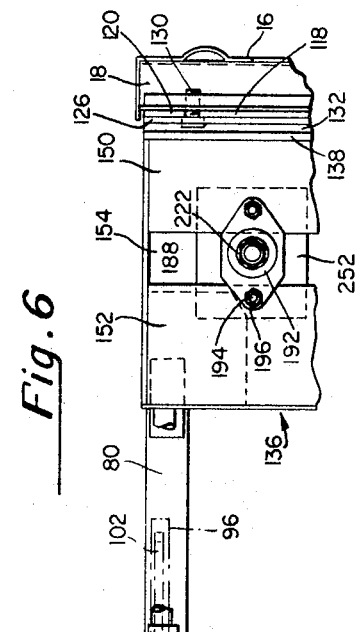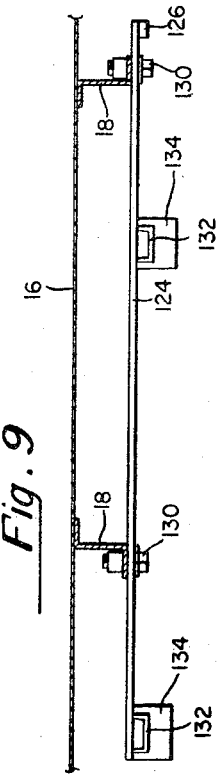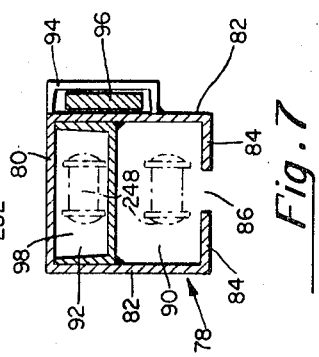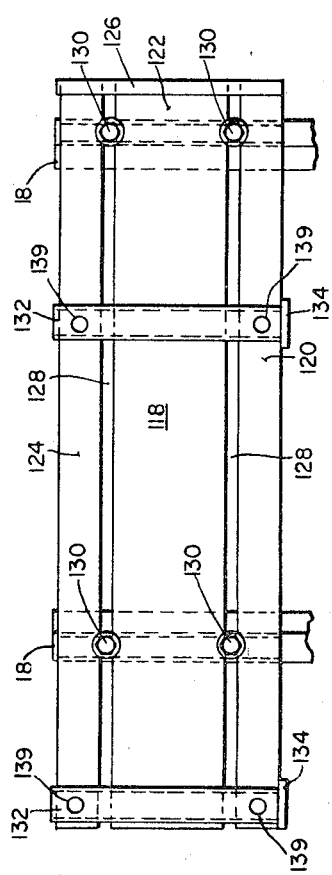
INVENTOR.
HENRY K. FLINCHBAUGH
BY
Paul & Paul
ATTORNEYS.

United States Patent Office 3,444,650
Patented May 20, 1969

3,444,650
APPARATUS FOR OPERATING AN
OVERHEAD VEHICLE DOOR
Henry K. Flinchbaugh, 930 Arlington Road,
York, Pa. 17403
Filed May 5, 1967, Ser. No. 636,475
Int. Cl. E05f 11/00
U.S. Cl. 49—360                                       1 Claim

ABSTRACT OF THE DISCLOSURE

The totally enclosed body of a motor freight vehicle is provided with an overhead door and a power drive for operating the door including a reversible electric motor for shifting a carriage fore and aft of the vehicle and thereby raising and lowering the door. As the carriage approaches the end of its traverse in either direction it trips a switch which sets up a circuit for reversing the direction of the motor. When the door is open, the operator manually actuates a start switch at the door end of the vehicle and thereby initiates the door closing operation. When the door is closed, the operator manually actuates another start switch from his seat in the cabin and thereby initiates the door opening operation. A friction clutch selectively operable from within or without the body of the vehicle for controlling power transmission is operatively interposed between the electric motor and the carriage. Normally, the clutch is engaged and the door cannot be opened manually. When the clutch is disengaged, the door may be opened manually.

BACKGROUND OF THE INVENTION

Field of the invention

The invention relates generally to door operating devices, and more particularly to power operated apparatus for controlling the operation of overhead doors.

Description of the prior art

Normally, the driver of a motor freight vehicle must be in his cab while the door of the vehicle is being raised or lowered, in consequence of which every time the door of the vehicle is opened or closed the contents of the vehicle may be unguarded for a period of time sufficient to afford an opportunity for pilfering the contents of the vehicle.

In an environment where alternating current is available, it is conventional to use an alternating current motor and a mechanically or electrically operated brake arrangement in the power drive for operating the door, but such an arrangement is not suitable where, as in the instant case, only direct current is available. The reason is variations in the uncontrolled speed of a direct current motor. The braking and stop positions of the door would vary excessively unless special equipment were employed to control the speed of the motor. The cost of such equipment is prohibitive.

Normally, with the conventional type of power operated apparatus for operating an overhead door, the door cannot be operated manually in the event of a power failure.

SUMMARY

Means is provided whereby the driver of the vehicle can initiate opening of the door of the vehicle body from his cab or driving position and immediately go to the door end of the vehicle without waiting for the door to open fully, and whereby the driver can initiate closing of the door of the vehicle body by means at the door end of the vehicle and immediately return to his cab or driving position without waiting for the door to close fully.

The body of the vehicle is provided with an overhead door and a power drive arrangement therefor including a direct current reversible electric motor and a friction clutch arrangement capable of effectively controlling the stop position of the door, the arrangement being such that, in the event of a power failure, the friction clutch may be disengaged, selectively from within or without the vehicle body, and the door opened or closed manually.

BRIEF DESCRIPTION OF THE DRAWINGS

FIGURE 2 is a view similar to FIGURE 1 but showing the cab end of the motor freight vehicle.

FIGURE 3 is a section generally along lines III—III in FIGURE 1.

FIGURE 4 is a section generally along lines IV—IV in FIGURE 2.

FIGURE 5 is similar to FIGURE 3 but shows an elevation of carriage mounting means.

FIGURE 6 is similar to FIGURE 4 but shows an elevation of carriage mounting means.

FIGURE 7 is an enlarged section on line VII—VII in FIGURE 5.

FIGURE 8 is a section on line VIII—VIII in FIGURE 4, showing a framework for mounting the power drive.

FIGURE 9 is a plan view of the framework shown in FIGURE 8.

FIGURE 10 is an enlarged view indicated by line X—X in FIGURE 4.

Figure 1:
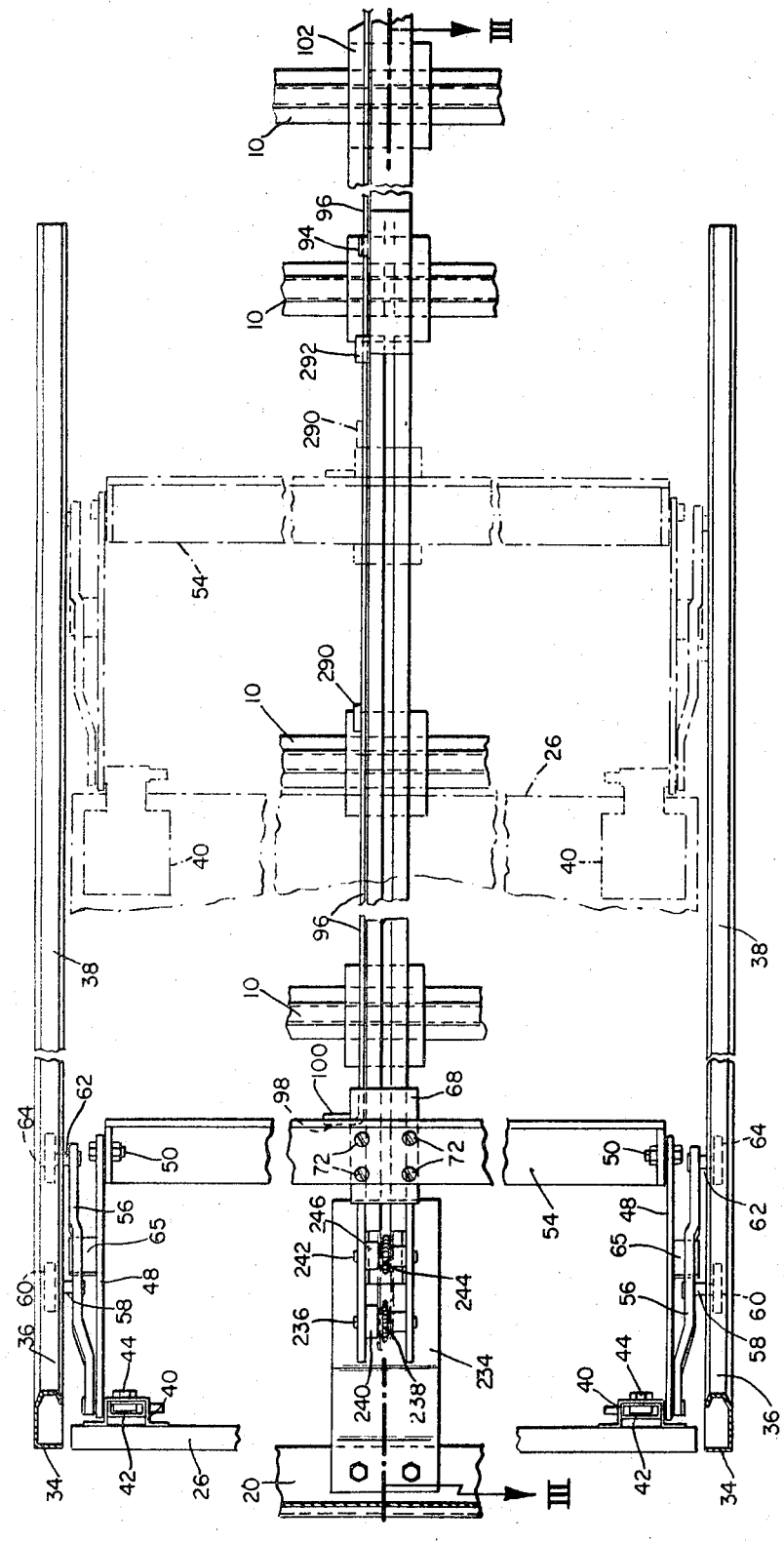
FIGURE 1 is a view of the door end of a motor freight vehicle constructed in accordance with the invention, as seen from inside the body of the vehicle and looking upwardly, the door-closed position being shown in full lines, and the door-open position being shown in phantom.

The following description is directed to the specific embodiment of the invention shown in the drawings. It is not addressed to the scope of the invention, which may be practiced in a variety of forms.

Referring to the drawings, a totally enclosed body type of vehicle embodying the invention includes a roof (not shown) supported upon laterally spaced beams 10, opposite side walls (not shown) and a front wall 16 supported upon laterally spaced Z bars 18. The vehicle is also provided with a rear wall, of which only a frame member 20 defining a door opening is shown.

The door opening defined by the frame 20 is closed by a door 22, which includes a top section 24 and a next lower section 26 hinged together, as at 28. On each side of the door, at the juncture of sections 24 and 26, is a roller 30 which works in a guide track, generally designated 32. The track 32 includes a lower section 34 extending along the door, a large radius intermediate section 36, and a section 38 underlying the roof of the vehicle body. The guide tracts 32 are parallel to each other and are provided with means (not shown) for anchoring the same in place. Affixed to each end of the top section 24 of the door 22 is a channel member 40 which slidably receives a tubular member 42 adjustably fixed in position by means of a bolt and slot connection, the bolt being indicated 44. The upper end of the tubular member 42 mounts a pin 46 to which one end of a link 48 is secured. The link 48 extends upwardly and away from the door to a pin 50 at the opposite end thereof. The pin 50 is carried by a plate 52 secured to an angle bar member 54. Also secured by one end portion thereof to the pin 46 is a bar 56, which extends upwardly and away from the door, being slightly less inclined than the link 48. Intermediate the opposite end portions of the bar 56 is a pin 58 mounting a roller 60 working in the associated guide track 32. The opposite end portion of the bar 56 carries a pin 62 mounting a roller 64 also working in the guide track 32. The axes of the pins 46, 58 and 62 lie in a common plane, and normally the pin 50 is disposed above said plane, as shown. A plate 65 affixed to the link 48 extends laterally therefrom and overhangs the associated bar 56, being disposed in spaced relation thereto.

Intermediate the ends of the angle bar member 54 is a carriage member 66 of inverted T-shape provided with a flange 68 and a stem 70. The flange 68 is bolted to the angle bar member 54 by means of bolts 72. Extending through the stem 70 of the carriage are a pair of laterally spaced pins 74 carrying a set of four rollers 76.

Underlying the roof of the vehicle is a track, generally designated 78, of inverted U-shape, comprising an upper wall 80 and opposite side walls 82 which terminate in laterally inwardly extending flanges 84 defining a guide slot 86. Within the track 78 is a channel member 88 which divides the interior of the track 78 into a lower passage 90 and an upper passage 92. Attached to one side wall of the track 78 are a plurality of brackets 94 slidably receiving a bar 96.

The door end of the bar 96 is provided with a laterally extending end portion 98 which engages a plate 100 extending upwardly from the angle bar member 54. The end of the bar 96 remote from the door mounts a cam 102, which (when the door 22 is open) engages a roller 104 carried by an arm 106 pivoted at 108 to a bracket 110. The arm 106 carries a bracket 116 adapted for actuating a switch 112 by depressing a pin 114.

Referring particularly to FIGURES 8 and 9, the framework 118 for carrying the power drive comprises plates 120, 122 and 124 secured together at corresponding ends by a bar 126 to provided longitudinally extending slots 128 for receiving bolts 130 which secure the frame to Z bars 14. The plate members 120, 122 and 124 carry laterally spaced channel members 132 to the lower extremities of which are affixed plate brackets 134.

The framework 118 carries a housing, generally designated 136, for a power drive. The housing includes a front wall 138 secured to the framework 118 by means of bolts 141 extending through holes 139. The housing is also provided with a rear wall 140 and a bottom wall 142, the front edge of which is crimped, as at 144, to extend under the brackets 134. The housing is also provided with a top wall 146. At one end is a wall 148 and at the opposite end is a wall provided with a front section 150 and a rear section 152 separated by a space 154.

Within the housing 136 is a mounting plate 156 which is fixed in position, and which carries a reversible motor 158. The source of energy for the motor is the motor vehicle storage battery 159. The motor shaft 160 mounts a pulley 162 about which is trained a V belt 164. The V belt is also trained about a pulley 166 affixed to a sleeve 168 carried by a stub shaft 172, one end of which is affixed to a plate 174 secured to the mounting plate 156 by means of bolts 176.

Also affixed to the sleeve 168 is a chain sprocket 178 about which is trained a chain belt 180. The chain 180 is also trained about a chain sprocket 181 which is affixed to the power input shaft 182 of a speed reducer 184. The power output shaft 186 of the reducer is provided with a reduced diameter end portion 188. Fitted over the reduced diameter end portion is a sleeve 190 extending through a bearing 192 which is affixed by bolts 194 and nuts 196 to the end wall plates 150 and 152. Affixed to the output shaft of the reducer is a flange 198 which is secured by a pin 200. Adjacent the flange 198 is a freely mounted friction disc 202, and adjacent the friction disc 202 is a freely mounted chain sprocket 204 provided with a hub 206. Next to the sprocket 204 is a second freely mounted friction disc 208, and next to the friction disc 208 is a flange 210 provided with a large diameter hub 212 and a small diameter hub 214. The flange 210 is splined to the shaft 186. Freely mounted upon the small hub 214 is a disc 216 which forms a seat for a compression spring 218. The other seat for the spring 218 is furnished by a freely mounted flange 220, which abuts one end of the sleeve 190. The opposite end of the sleeve 190 abuts the nuts 222.

Also carried by the housing 136 is a mounting plate 224, which carries a stub shaft 226 for an idler chain sprocket 228 and a stub shaft 230 for an idler chain sprocket 232.

At the door end of the track 78 is a bracket 234 which extends from the frame 20, and which carries a pin 236 for an idler chain sprocket 238. Spacers 240 keep the sprocket 238 centered. The bracket also carries a pin 242 for an idler chain sprocket 244. Spacers 246 keep the sprocket 244 centered. A chain 248 is trained over the drive sprocket 204 and idler sprockets 228, 232, 238 and 244 and the opposite end portions of the chain are anchored to the carriage, as at 250.

A plate 252 is freely mounted upon the large diameter hub 212. The bolts 194 extend through the plate 252 and furnish pivots for a pair of depending levers 254, the lower end portions of which are tied together by means of a bar 256 bolted to the levers, as at 258. Depending from the bar 256 is a handle 260, which extends freely through the bottom wall 142 of the housing. The heads of the bolts 194 abut the levers 254. Affixed to the bar 256 is one end of a cable 262. The opposite end of the cable is affixed to a shaft 264 provided with a circumferentially extending groove 266 and a handle 274. The shaft 264 extends through a sleeve 268 provided with a flange 270 overlying the front wall of the vehicle, and with a slot 272. Underlying the handle 274 is a key lock 276 provided with a bolt 278, the end of which extends through the slot 272 and into the groove 266.

The plate 252 is provided with a pair of balls 280 seated in depressions which accommodate a little more than one-half of each ball. The remainder of each ball is seated in a recess in the associated lever 254.

In the operation of the apparatus, when the vehicle arrives at its destination, the door 22 is closed. From the driver's seat the driver depresses the momentary switch 296 whereupon electric power is supplied to the motor 158 for operating in a direction to move the carriage 66 forwardly and to thereby raise the door 22. The driver may leave the cab immediately after depressing the switch to start the door opening operation and may be at the door end of the vehicle before the door is fully open.

Through the V-belt drive 164 a first stage of speed reduction is effected, and through the chain drive 180 a second stage of speed reduction is effected. The final stage of speed reduction is effected by the reducer 184.

The spring 218 presses disc 216 against the shoulder formed between hubs 212 and 214 of flange 210. The flange 210 is thereby pressed against friction disc 208, friction disc 208 against sprocket 204, sprocket 204 against friction disc 202 and friction disc 202 against flange 198. Thus sprocket 204 is clutched to the power take-off shaft 186 of the speed reducer 184 and turns with it.

The sprocket 204 actuates the chain 248, which moves the carriage 66 forwardly along the track 78.

The angle bar member 54 moves forwardly with the carriage 66 and through the links 48 pulls the top of the upper section 24 of the door 22 forwardly. The section 24 of the door pivots on the hinge 28 and starts to move upwardly and forwardly in door opening direction, with the rollers 30 respectively working in guide tracks 32.

As the carriage 66 continues to move forwardly, the pins 46 move along a curvilinear path, designated P, being guided along the path P by the roller mounted bars 56. As the carriage approaches the end of its traverse in a forward direction, it engages a bracket 290 depending from the bar 96, whereupon the bar 96 is carried forwardly. A member 292 affixed to the track 78 is provided for stopping the bracket 290 and the bar 96 in an extreme forward position. When the bar 96 moves forwardly the cam 102 carried thereby engages the roller 104 and swings the arm 106 and bracket 116 about the pivot 108. The bracket 116 depresses the pin 114, which actuates the switch 112. Thus a circuit is set up for reversing the motor 158 just before the door 22 is fully open.

After the vehicle is loaded or unloaded and it is time to reclose the door, the driver depresses the momentary switch 298 at the door end of the vehicle and immediately, without waiting for the door to fully close, goes to his seat in the cabin. By the time he reaches the front of the vehicle, the door is fully closed.

The door opening operation is now repeated, but in reverse order so that the door is closed—but with this difference: As the carriage approaches the end of its traverse toward the rear of the vehicle, the plate 100 upstanding from the angle bar member 54 engages the lateral extension 98 of the bar 96, whereupon the bar 96 and the cam 102 move rearwardly, the cam 102 being withdrawn from under the roller 104. Thereupon the pin 114 is released and the switch 112 actuated to again set up a circuit for reversing the motor 158.

The spring pressure for frictionally clutching the sprocket 204 to the shaft 186 may be relieved by actuating the levers 254. When these are turned about the bolts 194 the grooves or recesses in the levers 254 cam the balls 280 toward the plate 252, which is thereby forced against the disc 216 to compress the spring 218. The levers 254 may be actuated manually by means of the handle 260 from within the vehicle or manually by means of the cable 262 from within the cab of the vehicle. The cable is actuated by swinging the handle 274 clear of the lock 276, turning the key in the lock to remove the bolt 272 from the groove 266 and then pulling on the handle 274 to shift the shaft 264 forwardly in the sleeve 268.

When the spring pressure on flange 210 is relieved, the power drive connection between the motor 158 and the carriage 66 is broken, and the door may be moved up and down manually as desired. Before the spring pressure is relieved and the power drive connection broken, the door cannot be moved manually because of the resistance induced by the extreme speed reduction from the motor speed to the output speed of the speed reducer, and by resistance of the bolt 164 to being flexed over the drive pulley 162 and the driven pulley 166. This explains the absence of a special door locking or holding arrangement.

The arrangement is such that a portion of the momentum of the power drive is used to forceably close and hold the door against the bottom of the sill or bed of the vehicle body, the balance of the momentum being absorbed by the friction clutch arrangement. This explains the necessity for inclusion of the friction clutch.

Figure 11:
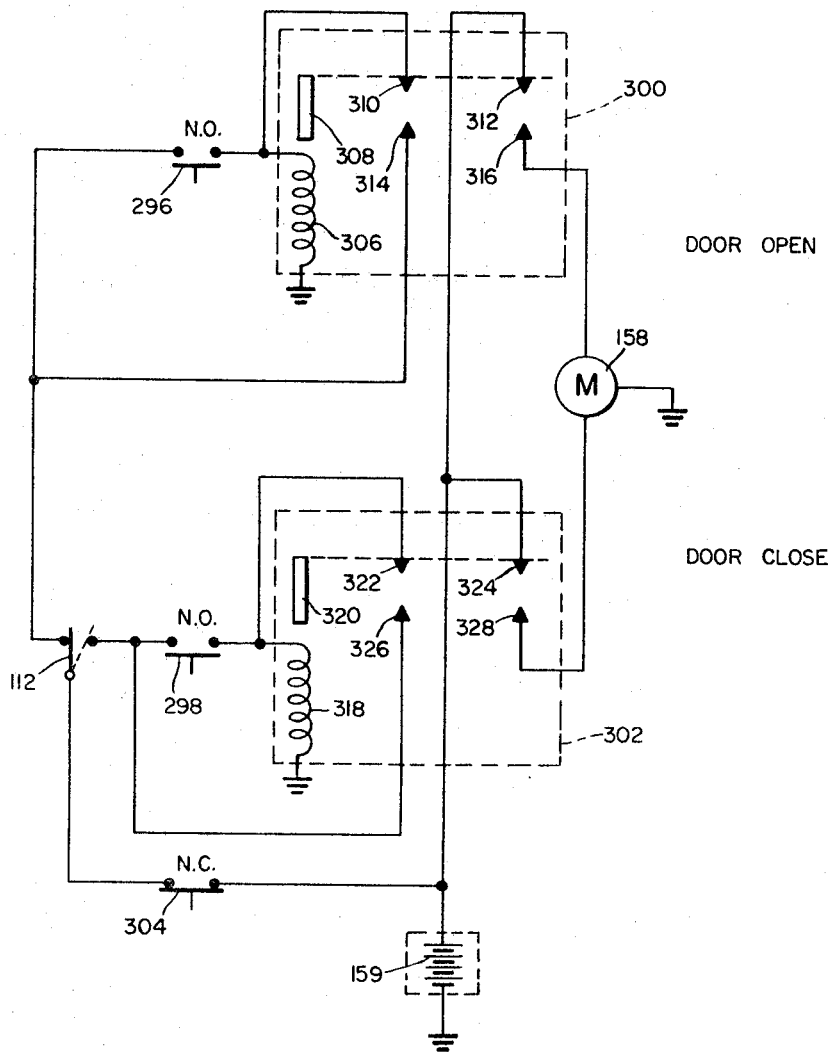
FIGURE 11 is a wiring diagram.

Referring particularly to FIGURE 11, which diagrammatically illustrates the electrical system for controlling the motor for operating the door 22 in accordance with the invention, battery 159 of the vehicle furnishes DC current (12 volts) for reversible motor 158. Door open and door close solenoids are designed respectively 300 and 302. The manually operated switches 296 (N.O.) and 298 (N.O.) are momentary switches. The switch 112 (operated by the cam 102) is a reverse control switch. An emergency disconnect switch (N.O.) is designated 304.

The door open solenoid 300 is provided with a coil 306, a plunger 308 which carries a pair of contacts 310 and 312 (insulated) from each other) and a pair of stationary contacts 314 and 316 respectively aligned with contacts 310 and 312. The door close solenoid 302 is provided with a coil 318, a plunger 320 which carries a pair of contacts 322 and 324 (insulated from each other), and a pair of stationary contacts 326 and 328 respectively aligned with contacts 322 and 324.

Assuming that the door is closed, the coils 306 and 318 of the solenoids 300 and 302 are not energized and the contacts of the solenoids are open, as shown, as a consequence of which power is not furnished to the motor 158. From his seat in the cab of the vehicle, the operator may depress switch 296, whereupon the coil 306 is energized and the contacts 310 and 312 close on contacts 314 and 316 and power is thereby furnished the motor 158 through contacts 312 and 316 for running in door opening direction. When the switch 296 reopens, the coil 306 remains energized through contacts 310 and 314. When the cam 102 engages and operates the switch 112, the coil 306 is deenergized and the contacts 310 and 312 disengage from contacts 314 and 316, as a consequence of which power to the motor 158 is cut off.

From a positon at the rear of the vehicle, the operator may now depress switch 298, whereupon the coil 318 is energized and the contacts 322 and 324 close on contacts 326 and 328 and power is thereby furnished the motor 158 for running in door closing direction. When the switch 298 reopens, the coil 318 remains energized through contacts 322 and 326. When the cam 102 disengages from switch 112, the coil 318 is deenergized and the contacts 322 and 324 disengage from the contacts 326 and 328, as a consequence of which power is again cut off from the motor 158. The door 22 and the electrical system have now been restored to their initial conditions, the door being in closed condition and the electrical system in the condition shown in FIGURE 11.

What is claimed is:

1. In an overhead vehicle door and apparatus for operating the same, the combination comprising:
    (A) an overhead door in an upright position for closing an opening in a vehicle enclosure;
    (B) means mounting said door for movement between said closed position and an overhead open position underlying the roof of said enclosure, said mounting means including:
    (a) rollers mounted on said door, and
    (b) guide track means for said rollers each having a section extending along said door and joined by a large radius curvilinear intermediate section to a section underlying the roof of said vehicle;
    (C) a carriage underlying the roof of said enclosure and mounted for being manually shifted fore and aft of said enclosure,
    (D) means connecting said carriage to said door for being actuated thereby in response to movement of said door manually by the operator, said connecting means including:
    (a) link means extending upwardly and away from a pivotal connection to the upper end portion of said door to a pivotal connection to said carriage;
    (E) means for guiding the upper end portion of said door along a curvilinear path generally parallel to said intermediate guide track section;
    (F) drive means for actuating the carriage and thereby opening and closing the door, including releasable means operative for holding said door fixed in position against any manual effort to move the door, said drive means including:
    (a) a power take-off shaft,
    (b) a flange fixedly mounted upon said shaft,
    (c) a revolvable member freely mounted on said shaft,
    (d) a friction disc interposed between said flange and revolvable member,
    (e) spring means biasing said revolvable member against said friction disc and said friction disc against said flange for turning of said revolvable member, friction disc and flange with said shaft as a unit, (f) means operable against the influence of said spring means for releasing said revolvable member for turning freely on said shaft, (g) means connecting said revolvable member with said carriage for actuating the same, (h) a second flange having large and small diameter hubs and an annular shoulder therebetween mounted on said shaft, (i) a second friction disc interposed between said said second flange and revolvable member, (j) a spring seat disc freely mounted on the smaller of said hubs and pressed against said shoulder by the spring means for urging said second flange against said second friction disc and said second friction disc against said revolvable member, (k) a plate freely mounted on the larger of said hubs and adjacent said spring seat disc, and (l) means for pressing said plate against said spring seat disc in a direction to compress said spring means, including operating lever means selectively operable from within or without the enclosure.

References Cited

UNITED STATES PATENTS

| | | | |
|---|---|---|---|
| 1,933,700 | 11/1933 | Blodgett | 160—188 |
| 2,637,550 | 5/1953 | Ritter | 160—188 |
| 2,920,151 | 1/1960 | Lawick | 160—188 |
| 3,066,729 | 12/1962 | Gessell | 49—139 X |
| 3,164,761 | 1/1965 | Richmond | 49—139 X |
| 3,336,968 | 8/1967 | Curtis | 160—188 |

DAVID J. WILLIAMOWSKY, *Primary Examiner.*

J. K. BELL, *Assistant Examiner.*

U.S. Cl X.R.

160—188